(12) United States Patent
Ahmed (10) Patent No.: US 9,668,613 B2
(45) Date of Patent: Jun. 6, 2017

(54) HIGH EFFICIENCY APPARATUS AND METHOD FOR COOKING, HEATING AND DRYING

(71) Applicant: W.C. Bradley Co., Columbus, GA (US)

(72) Inventor: Mallik Ahmed, Columbus, GA (US)

(73) Assignee: W.C. BRADLEY CO., Columbus, GA (US)

( * ) Notice: Subject to any disclaimer, the term of this patent is extended or adjusted under 35 U.S.C. 154(b) by 194 days.

(21) Appl. No.: 14/305,490

(22) Filed: Jun. 16, 2014

(65) Prior Publication Data

US 2015/0079259 A1    Mar. 19, 2015

Related U.S. Application Data

(60) Provisional application No. 61/835,747, filed on Jun. 17, 2013.

(51) Int. Cl.
*A47J 37/04* (2006.01)
*A21B 1/48* (2006.01)
(Continued)

(52) U.S. Cl.
CPC .............. *A47J 37/045* (2013.01); *A21B 1/28* (2013.01); *A21B 1/48* (2013.01); *A23L 5/15* (2016.08);
(Continued)

(58) Field of Classification Search
CPC ...... A47J 39/006; A47J 37/044; A47J 37/045; F27D 2099/0045; F26B 21/04;
(Continued)

(56) References Cited

U.S. PATENT DOCUMENTS 116,927 A  *  7/1871  Brooks ..................... F24B 7/04
                                                                  126/70
1,158,986 A    11/1915  Cronwall
(Continued)

FOREIGN PATENT DOCUMENTS

CN       1240910       1/2000
CN       1739407 A     3/2006
(Continued)

OTHER PUBLICATIONS

Char-Broil, "Assembly Instructions for Models 6320, 6321 & 6323"; 1992, pp. 1-18.
"Cross Section of G-Series Burner System"; Sep. 4, 2001; Publisher: Thermal Engineering Corp., Columbia, SC; Published in: US.
(Continued)

*Primary Examiner* — Steven B McAllister
*Assistant Examiner* — Steven Anderson, II
(74) *Attorney, Agent, or Firm* — Dennis D. Brown; Brown Patent Law, P.L.L.C.

(57) ABSTRACT

An apparatus and method for cooking, heating, or drying in which, as items or materials are conveyed through a heating chamber by a linear, spiral, or other type of conveyor, hot combustion product gases are delivered upwardly through an upwardly extending first annulus or other flow gap which is closest to the conveyor. The hot combustion product gases are then delivered downwardly through the heating chamber into contact with the items or materials on the conveyor. Next the combustion product gases are delivered from the lower portion of the heating chamber into the lower portion of a second annulus or other flow gap or passage. The second flow gap or passage is separated from the heating chamber by the first annulus or other flow gap. Subsequently, the combustion product gases are delivered upwardly through the second flow gap or passage.

2 Claims, 5 Drawing Sheets

(51) Int. Cl.
  *F26B 15/00* (2006.01)
  *F26B 23/02* (2006.01)
  *A21B 1/28* (2006.01)
  *F26B 3/04* (2006.01)
  *F26B 15/04* (2006.01)
  *A23L 5/10* (2016.01)

(52) U.S. Cl.
  CPC ............... *F26B 3/04* (2013.01); *F26B 15/00* (2013.01); *F26B 15/04* (2013.01); *F26B 23/02* (2013.01); *A23V 2002/00* (2013.01); *F26B 2015/006* (2013.01)

(58) Field of Classification Search
  CPC ...... F26B 15/00; F26B 2015/006; F26B 3/04; F26B 15/04; F26B 23/02; F26B 21/02; F24B 7/04–7/045; A21B 1/33; A21B 1/10–1/14; A21B 1/46–1/48; A21B 1/28; H05B 6/6485; A23L 5/15
  USPC ......................................... 126/25 R; 432/159
  See application file for complete search history.

(56) References Cited

U.S. PATENT DOCUMENTS

| | | | |
|---|---|---|---|
| 1,399,704 A | 12/1921 | Eida | |
| 2,001,615 A | 5/1935 | William | |
| 3,155,814 A | 11/1964 | Appleman et al. | |
| 3,245,458 A | 4/1966 | Patrick et al. | |
| 3,277,948 A | 10/1966 | Best | |
| 3,437,415 A | 4/1969 | Davis et al. | |
| 3,561,902 A | 2/1971 | Best | |
| 3,586,825 A | 6/1971 | Hurley | |
| 3,663,798 A | 5/1972 | Speidel et al. | |
| 3,683,058 A | 8/1972 | Partiot | |
| 3,788,301 A | 1/1974 | Terry | |
| 3,830,624 A * | 8/1974 | Sperring | A21B 1/02 432/145 |
| 3,941,117 A | 3/1976 | Pei et al. | |
| 4,024,839 A | 5/1977 | Reid, Jr. et al. | |
| 4,039,275 A | 8/1977 | McGettrick | |
| 4,057,670 A | 11/1977 | Scheidler | |
| 4,140,100 A | 2/1979 | Ishihara | |
| 4,203,486 A * | 5/1980 | Rubbright | A47J 39/006 165/267 |
| 4,207,456 A | 6/1980 | Best | |
| 4,235,023 A | 11/1980 | Best | |
| 4,276,869 A | 7/1981 | Kern | |
| 4,321,857 A | 3/1982 | Best | |
| 4,375,802 A | 3/1983 | Wallasvaara | |
| 4,403,541 A | 9/1983 | Berger | |
| 4,403,597 A | 9/1983 | Miller | |
| 4,426,792 A | 1/1984 | Best | |
| 4,437,833 A | 3/1984 | Mertz | |
| 4,508,097 A | 4/1985 | Berg | |
| 4,537,492 A | 8/1985 | Lein et al. | |
| 4,546,553 A | 10/1985 | Best | |
| 4,569,657 A | 2/1986 | Laspeyres | |
| 4,575,616 A | 3/1986 | Bergendal | |
| 4,606,261 A | 8/1986 | Bernardi | |
| 4,715,356 A | 12/1987 | Reynolds | |
| 4,785,552 A | 11/1988 | Best | |
| 4,798,192 A | 1/1989 | Maruko | |
| 4,839,502 A | 6/1989 | Swanson et al. | |
| 4,883,423 A | 11/1989 | Holowczenko | |
| 4,886,044 A | 12/1989 | Best | |
| 4,889,972 A | 12/1989 | Chang | |
| 4,909,137 A | 3/1990 | Brugnoli | |
| 4,960,977 A | 10/1990 | Alden | |
| 4,979,436 A * | 12/1990 | McGowan | A23B 4/052 126/25 R |
| 5,024,209 A | 6/1991 | Schaupert | |
| 5,028,760 A | 7/1991 | Okuyama | |
| 5,029,534 A * | 7/1991 | Childs | F23M 5/00 110/211 |
| 5,062,408 A | 11/1991 | Smith et al. | |
| 5,062,788 A | 11/1991 | Best | |
| 5,111,803 A | 5/1992 | Barker et al. | |
| 5,218,952 A | 6/1993 | Neufeldt | |
| 5,230,161 A | 7/1993 | Best | |
| 5,240,411 A | 8/1993 | Abalos | |
| 5,277,106 A | 1/1994 | Raymer et al. | |
| 5,279,277 A | 1/1994 | Barker | |
| 5,306,138 A | 4/1994 | Best | |
| 5,313,877 A | 5/1994 | Holland | |
| 5,320,086 A | 6/1994 | Beal et al. | |
| 5,322,007 A | 6/1994 | Caridis et al. | |
| 5,363,567 A | 11/1994 | Best | |
| 5,421,317 A * | 6/1995 | Cole | F24C 15/2042 126/21 A |
| 5,488,897 A | 2/1996 | Snyder | |
| 5,494,003 A | 2/1996 | Bartz et al. | |
| 5,509,403 A | 4/1996 | Kahlke et al. | |
| 5,513,623 A | 5/1996 | Hong | |
| 5,566,607 A | 10/1996 | Schleimer | |
| 5,567,459 A | 10/1996 | Gonzalez-Hernandez et al. | |
| 5,571,009 A | 11/1996 | Stalhane et al. | |
| 5,582,094 A | 12/1996 | Peterson et al. | |
| 5,594,999 A | 1/1997 | Best | |
| 5,599,471 A | 2/1997 | Zaidman | |
| 5,676,043 A | 10/1997 | Best | |
| 5,711,661 A | 1/1998 | Kushch et al. | |
| 5,761,990 A | 6/1998 | Stewart et al. | |
| 5,782,166 A | 7/1998 | Lin | |
| 5,823,099 A | 10/1998 | Ko | |
| 5,879,154 A | 3/1999 | Suchovsky | |
| 5,890,422 A | 4/1999 | Clark et al. | |
| 5,909,533 A | 6/1999 | Kitabayashi et al. | |
| 5,989,013 A | 11/1999 | Gray | |
| 6,114,666 A | 9/2000 | Best | |
| 6,142,066 A | 11/2000 | Anders et al. | |
| 6,159,001 A | 12/2000 | Kushch et al. | |
| 6,190,162 B1 | 2/2001 | Smith et al. | |
| 6,205,996 B1 | 3/2001 | Ryan | |
| 6,461,150 B1 | 10/2002 | Sirand | |
| 6,657,168 B1 | 12/2003 | Lazzer | |
| 6,761,160 B1 | 7/2004 | Haygood | |
| 6,779,519 B2 | 8/2004 | Harneit | |
| 6,783,226 B2 | 8/2004 | Szlucha | |
| 7,107,899 B2 | 9/2006 | Nothum, Jr. | |
| 7,202,447 B2 | 4/2007 | Kingdon et al. | |
| 7,219,663 B2 | 5/2007 | Cuomo | |
| 7,726,967 B2 | 6/2010 | Best | |
| 8,074,634 B2 | 12/2011 | Best | |
| 8,227,728 B2 | 7/2012 | Best | |
| 2001/0036610 A1 | 11/2001 | Wood | |
| 2002/0020405 A1 | 2/2002 | Coleman et al. | |
| 2004/0011350 A1 | 1/2004 | Dowst et al. | |
| 2004/0060552 A1 | 4/2004 | Yamada et al. | |
| 2004/0152028 A1 | 8/2004 | Singh et al. | |
| 2004/0250688 A1 | 12/2004 | Farkas et al. | |
| 2005/0204934 A1 | 9/2005 | Robertson | |
| 2005/0226976 A1 | 10/2005 | Chung | |
| 2006/0003279 A1 | 1/2006 | Best | |
| 2006/0021517 A1 | 2/2006 | Best | |
| 2006/0042473 A1 | 3/2006 | Silvestrini | |
| 2006/0266979 A1 | 11/2006 | Ra | |
| 2007/0125357 A1 | 6/2007 | Johnston | |
| 2007/0131234 A1 | 6/2007 | Moore | |
| 2008/0072890 A1 | 3/2008 | Best | |
| 2008/0121117 A1 | 5/2008 | Best | |
| 2009/0095738 A1 * | 4/2009 | McNamee | H05B 6/6485 219/679 |
| 2011/0186561 A1 | 8/2011 | Ahmed | |
| 2012/0222665 A1 | 9/2012 | Ahmed | |
| 2012/0318254 A1 | 12/2012 | Howard | |
| 2012/0324950 A1 * | 12/2012 | Dale | C03B 29/10 65/27 |
| 2013/0008427 A1 | 1/2013 | Ahmed | |

FOREIGN PATENT DOCUMENTS

| | | |
|---|---|---|
| CN | 201131268 Y | 10/2008 |
| CN | 201182182 Y | 1/2009 |

(56) References Cited

FOREIGN PATENT DOCUMENTS

| | | | |
|---|---|---|---|
| CN | 201467899 U | 5/2010 | |
| CN | 202035428 U | 11/2011 | |
| CN | 102422865 A | 4/2012 | |
| CN | 102472498 A | 5/2012 | |
| CN | 202760081 U | 3/2013 | |
| CN | 202842241 U | 4/2013 | |
| DE | 10215 688 A1 | 6/2003 | |
| EP | 0 221 686 | 10/1986 | |
| EP | 0528593 A1 | 2/1993 | |
| EP | 1 028 292 A1 | 8/2000 | |
| EP | 1 096 203 | 5/2001 | |
| FR | 1 129 123 | 1/1957 | |
| FR | 1 204 968 | 1/1960 | |
| FR | 1387132 | 1/1965 | |
| FR | 70 02058 | 9/1971 | |
| FR | 2076610 | 10/1971 | |
| FR | 2472141 | 12/1980 | |
| GB | 23552 | 3/1915 | |
| GB | 432481 | 12/1933 | |
| GB | 562136 | 6/1944 | |
| GB | 576377 | 4/1946 | |
| GB | 1029774 | 7/1963 | |
| GB | 1339345 | 12/1973 | |
| GB | 2 362 451 | 11/2001 | |
| GB | 2 409 265 | 6/2005 | |
| JP | 2000 121064 | 4/2000 | |
| JP | 2004 179089 | 6/2004 | |
| WO | WO 2004103133 A1 | 12/2004 | |
| WO | WO 2006080949 A2 | 8/2006 | |
| WO | WO 2008125258 A2 | 10/2008 | |

OTHER PUBLICATIONS

P. Sheridan, et al., "Application of Far Infra-Red Radiation to Cooking of Meat Products"; 1999; pp. 203-208 (Abstract Only), vol. 1, No. 3/4; Publisher: Journal of Food Engineering; Published in: US.

"Cross Section of G3000 Cabinet Unit"; Sep. 4, 2001; Publisher: Thermal Engineering Corp., Columbia, SC; Published in: US.

Sheridan, et al., "Analysis of Yield While Cooking Beefburger Patties Using Far Infrared Radiation"; 2002; pp. 3-11, vol. 51; Publisher: Journal of Food Engineering; Published in: US.

N.C. Shilton, et al., "Determination of the Thermal Diffusivity of Ground Beef Patties Under Infrared Radiation Oven-Shelf Cooking"; Mar. 2002; pp. 39-45 (Abstract Only), vol. 52, No. 1; Publisher: Journal of Food Engineering; Published in: US.

N. Shilton, et al., "Modeling of Heat Transfer and Evaporate Mass Losses During the Cooking of Beef Patties Using Far-Infrared Radiation"; 2002; pp. 217-222 (Abstract Only), vol. 55, No. 3; Publisher: Journal of Food Engineering; Published in: US.

Y. Takahashi, et al., "Impact of IR Broiling Onthe Thiamin and Riboflavin Retention and Sensory Quality of Salmon Steaks for Foodservice Use"; 1987; pp. 4-6 (Abstract Only), vol. 52, No. 1; Publisher: Journal of Food Science; Published in: US.

U.S. Appl. No. 14/305,718; "Outdoor Ooker and Smoker, and Fuel Combustor Therefor"; First Named Inventor: Mallik Ahmed; filed Jun. 16, 2014.

PCT/US2014/042516; International Search Report and Written Opinion; Nov. 4, 2014; Applicant: W.C. Bradley Co.; Published in: WO.

State Intellectual Property Office of People's Replubic China; Search Report; Nov. 23, 2016; China.

* cited by examiner

HIGH EFFICIENCY APPARATUS AND METHOD FOR COOKING, HEATING AND DRYING

RELATED CASE

This application claims the benefit of U.S. Provisional Patent Application Ser. No. 61/835,747 filed on Jun. 17, 2013 and incorporates said provisional application by reference into this document as if fully set out at this point.

FIELD OF THE INVENTION

The present invention relates to combustion-type apparatuses and methods for cooking food products and for heating and/or drying other items and materials.

BACKGROUND OF THE INVENTION

A need exists for improved linear, tunnel-type, box-type, spiral, and other industrial combustion (e.g., gas) ovens and oven systems for cooking food items, or for heating and/or drying other items or materials, as the items or materials are continuously, semi-continuously, or intermittently delivered through the oven. A need also exists for a means of significantly reducing temperature differences and substantially eliminating the presence of cold and/or hot pockets within these combustion-type systems.

SUMMARY OF THE INVENTION

The present invention provides a combustion-type apparatus and method for cooking food items, or for heating and/or drying items or materials of any other type, which satisfy the needs and alleviate the problems discussed above. The inventive apparatus and method improve the energy efficiency of the cooking, heating, and/or drying process to a degree which is both surprising and unexpected. In addition, a much more uniform temperature profile is provided within the inventive apparatus during operation and hot and cold pockets within the apparatus are substantially eliminated.

In one aspect, the inventive apparatus preferably comprises a housing having: (1) upwardly extending left and right side interior walls; (2) a heating chamber (i.e., a chamber for cooking, warming, and/or drying food products or other items or materials) defined between the left and right side interior walls; (3) upwardly extending left and right side outer walls respectively positioned outwardly from the left and right side interior walls; (4) an upwardly extending left side intermediate wall positioned between the left side interior and outer walls; (5) an upwardly extending left side inner combustion product gas flow gap formed between the left side interior and intermediate walls; (6) an upwardly extending left side outer combustion product gas flow gap formed between the left side intermediate and outer walls; (7) an upwardly extending right side intermediate wall positioned between the right side interior and outer walls; (8) an upwardly extending right side inner combustion product gas flow gap formed between the right side interior and intermediate walls; and (9) an upwardly extending right side outer combustion product gas flow gap formed between the right side intermediate and outer walls.

The inventive apparatus preferably also comprises one or more fuel burners positioned to deliver a combustion product gas into the lower end portions of the left and right side inner combustion product gas flow gaps. In addition, the left and right side inner combustion product gas flow gaps preferably have upper end portions which are in fluid communication with an upper portion of the heating chamber to deliver the combustion product gas from of the upper end portions of the left and right side inner combustion product gas flow gaps into the upper portion of the heating chamber.

Further, the housing preferably also includes a plurality of outwardly extending side flow passages located in a lower portion of the heating chamber which place the lower portion of the heating chamber in fluid communication with the lower portions of the left and right side outer combustion product gas flow gaps for delivering the combustion product gas from the lower portion of the heating chamber to the lower end portions of the left and right side outer combustion product gas flow gaps.

In another aspect, there is provided an apparatus for cooking, heating or drying comprising: a housing; a heating chamber within the housing for cooking, heating, or drying; a conveyor extending through the heating chamber; an upwardly extending first wall of the housing; an upwardly extending interior heating chamber wall of the housing inside of the upwardly extending first wall, wherein the upwardly extending interior heating chamber wall faces the conveyor; an upwardly extending intermediate wall of the housing between the upwardly extending first wall and the upwardly extending interior heating chamber wall; an upwardly extending inner flow gap which is formed between the upwardly extending interior heating chamber wall and the upwardly extending intermediate wall; an upwardly extending outer flow gap which is formed between the upwardly extending intermediate wall and the upwardly extending first wall; and a flow path defined in the housing for combustion products, wherein the flow path travels through the upwardly extending inner flow gap, the heating chamber, and the upwardly extending outer flow gap.

In another aspect, this apparatus can further comprise a plurality of flow ducts located at a lower portion of the heating chamber which extend outwardly through the upwardly extending inner flow gap to place the lower portion of the heating chamber in fluid communication with a lower portion of the upwardly extending outer flow gap.

In another aspect, the flow path defined in the housing of this apparatus for the combustion products can preferably travel upwardly through the upwardly extending inner flow gap, then downwardly through the heating chamber, then outwardly through the flow ducts from the lower portion of the heating chamber to the lower portion of the upwardly extending outer flow gap, and then upwardly through the upwardly extending outer flow gap.

In another aspect, this apparatus can comprise identical or substantially identical wall and flow gap structures and identical or substantially preferred flow paths as described above on both the left side and the right side of a linear or other conveyor.

In another alternative aspect of this apparatus, the conveyor can be a spiral conveyor wherein the upwardly extending inner flow gap and the upwardly extending outer flow gap will preferably surround the heating chamber and the spiral conveyor in a horizontal plane. Also, the apparatus can further optionally include (i) a flow annulus which extends upwardly through a central portion of the heating chamber, wherein the spiral conveyor is outside of and winds around the flow annulus and (ii) a flow passage which extends upwardly through and is surrounded by, but is different from, the flow annulus such that the flow path defined in the housing for combustion products also travels through the central flow annulus and the central flow passage.

In another aspect, there is provided an apparatus for cooking, heating or drying comprising: a housing; a heating chamber within the housing for cooking, heating, or drying; a flow annulus which extends upwardly through a central portion of the heating chamber; a flow passage which extends upwardly through and is surrounded by, but is different from, the flow annulus; a conveyor which winds vertically within the heating chamber outside of and around the flow annulus; and a flow path defined in the housing for combustion products, wherein the flow path travels through the flow annulus, the heating chamber, and the flow passage. Preferably, the flow path defined in the housing for the combustion products travels upwardly through the flow annulus, then downwardly through the heating chamber, then inwardly through a plurality of flow ducts extending inwardly from the lower portion of the heating chamber to the lower portion of the flow passage, and then upwardly through the flow passage.

In another aspect, there is provided a method of cooking, heating or drying items or materials comprising the steps of: (a) conveying the items or materials, using a conveyor, through a heating chamber with a housing; (b) heating an upwardly extending right side inner wall within the housing facing the right side of the conveyor by delivering a first portion of a combustion product flow upwardly through an upwardly extending right side inner flow gap formed between the upwardly extending right side inner wall and an upwardly extending second right side wall positioned outside of the upwardly extending right side inner wall; (c) heating an upwardly extending left side inner wall within the housing facing the left side of the conveyor by delivering a second portion of the combustion product flow upwardly through an upwardly extending left side inner flow gap formed between the upwardly extending left side inner wall and an upwardly extending second left side wall positioned outside of the upwardly extending left side inner wall; (d) delivering the first and the second portions of the combustion product flow from upper portions of the upwardly extending right side and left side inner flow gaps into an upper portion of the heating chamber to form a combined combustion product flow; (e) delivering the combined combustion product flow downwardly through the heating chamber; (f) delivering a first portion of the combined combustion product flow from a lower portion of the heating chamber into a lower portion of an upwardly extending right side outer flow gap formed between the upwardly extending right side second wall and an upwardly extending right side third wall positioned outside of the upwardly extending right side second wall and delivering a second portion of the combined combustion product flow from the lower portion of the heating chamber into a lower portion of an upwardly extending left side outer flow gap formed between the upwardly extending left side second wall and an upwardly extending left side third wall positioned outside of the upwardly extending left side second wall; and (g) delivering the first and the second portions of the combined combustion product flow upwardly through the upwardly extending right side and left side outer flow gaps.

In another aspect, there is provided a method of cooking, heating or drying items or materials comprising the steps of: (a) conveying the items or materials vertically through a heating chamber in a spiral pattern using a spiral conveyor; (b) delivering combustion products upwardly through an upwardly extending inner flow gap formed between an upwardly extending inner wall and an upwardly extending second wall positioned outside of the upwardly extending inner wall, wherein the upwardly extending inner wall faces the spiral conveyor and surrounds the spiral conveyor in a horizontal plane and the upwardly extending inner flow gap surrounds the spiral conveyor in the horizontal plane; (c) delivering the combustion products from an upper portion of the upwardly extending inner flow gap into an upper portion of the heating chamber; (d) delivering the combustion products downwardly through the heating chamber; (e) delivering the combustion products from a lower portion of the heating chamber into a lower portion of an upwardly extending outer flow gap formed between the upwardly extending second wall and an upwardly extending third wall positioned outside of the upwardly extending second wall, wherein the upwardly extending outer flow gap surrounds the spiral conveyor in the horizontal plane; and then (f) delivering the combustion products upwardly through the upwardly extending outer flow gap.

In additional optional aspects of this method: step (b) can further comprise delivering an additional amount of combustion products upwardly through a flow annulus which extends upwardly through a central portion of the heating chamber, wherein the spiral conveyor is outside of and winds around the flow annulus; step (c) can further comprise delivering the additional amount of combustion products from an upper portion of the flow annulus into the upper portion of the heating chamber; step (e) can further comprise delivering at least a portion of the additional amount of combustion products from the lower portion of the heating chamber into a lower portion of a flow passage which extends upwardly through and is surrounded by, but is different from, the flow annulus; and step (f) can further comprise delivering the portion of the additional amount of combustion products upwardly through the flow passage.

In another aspect, there is provided a method of cooking, heating or drying items or materials comprising the steps of: (a) conveying the items or materials vertically through a heating chamber in a spiral pattern using a spiral conveyor; (b) delivering combustion products upwardly through a flow annulus which extends upwardly through a central portion of the heating chamber, wherein the spiral conveyor is outside of and winds around the flow annulus; (c) delivering the combustion products from an upper portion of the flow annulus into an upper portion of the heating chamber; (d) delivering the combustion products downwardly through the heating chamber; (e) delivering the combustion products from a lower portion of the heating chamber into a lower portion of a flow passage which extends upwardly through and is surrounded by, but is different from, the flow annulus; and then (f) delivering the combustion products upwardly through the flow passage. In step (e), the combustion products are preferably delivered through a plurality of flow ducts which extend inwardly through the flow annulus from the lower portion of the heating chamber to the lower portion of the flow passage.

In another aspect, to provide an increase percentage of convective heat transfer and/or increased browning, the method of cooking, heating or drying can be modified, for example, to comprise the steps of: (a) conveying the items or materials, using a conveyor, through a heating chamber within a housing; (b) heating an upwardly extending first wall within the housing facing the conveyor by delivering a first portion of a combustion product flow upwardly through an upwardly extending first flow gap formed between the upwardly extending first wall and an upwardly extending second wall spaced apart from the upwardly extending first wall; (c) delivering the first portion of the combustion product flow from an upper end portion of the upwardly extending first flow gap into an upper end portion of the heating chamber; (d) delivering a second portion of the combustion product flow from the upwardly extending first flow gap into the heating chamber through a plurality of apertures provided through the upwardly extending first wall; (e) delivering the first and the second portions of the combustion product flow downwardly through the heating chamber; (f) delivering the first and second portions of the combustion product flow as a combined combustion product flow from a lower end portion of the heating chamber into a lower end portion of an upwardly extending second flow gap formed between the upwardly extending second wall and an upwardly extending third wall spaced apart from the upwardly extending second wall; and then (g) delivering the combined combustion product flow upwardly through the upwardly extending second flow gap.

In this modified method, the number and size of the apertures provided through the upwardly extending first wall will preferably be such that the second portion of the combustion product flow will be less than or equal to the first portion of the combustion product flow on a weight basis. More preferably, the second portion of the combustion product flow will not be more than one half of the first portion of the combustion product flow on a weight basis. The apertures or can be provided through the upwardly extending first wall in any pattern desired.

In another aspect, there is provided a method of cooking, heating or drying items or materials comprising the steps of: (a) conveying the items or materials, using a conveyor, through a heating chamber within a housing; (b) heating an upwardly extending first wall within the housing facing the conveyor by delivering a combustion product flow upwardly through an upwardly extending first flow gap formed between the upwardly extending first wall and an upwardly extending second wall spaced apart from the upwardly extending first wall; (c) delivering the combustion product flow from an upper end portion of the upwardly extending first flow gap into an upper end portion of the heating chamber; (d) delivering the combustion product flow downwardly through the heating chamber; (f) delivering the combustion product flow from a lower end portion of the heating chamber into a lower end portion of an upwardly extending second flow gap formed between the upwardly extending second wall and an upwardly extending third wall spaced apart from the upwardly extending second wall; and then (g) delivering the combustion product flow upwardly through the upwardly extending second flow gap.

Further aspects, features, and advantages of the present invention will be apparent to those of ordinary skill in the art upon examining the accompanying drawings and upon reading the following Detailed Description of the Preferred Embodiments.

DETAILED DESCRIPTION OF THE PREFERRED EMBODIMENTS

Figure 1:
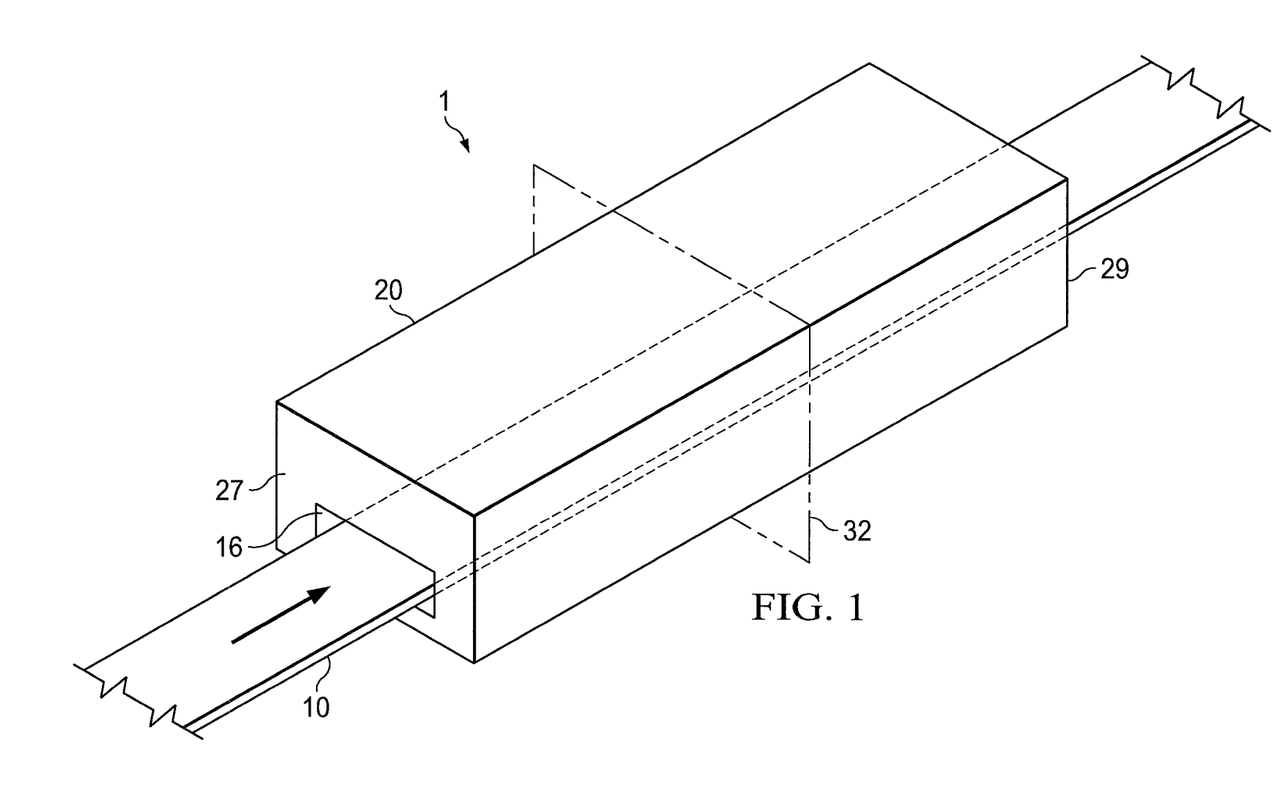
FIG. 1 is a perspective view of a linear, tunnel-type embodiment 1 of the inventive cooking, heating, and/or drying apparatus.
Figure 2:
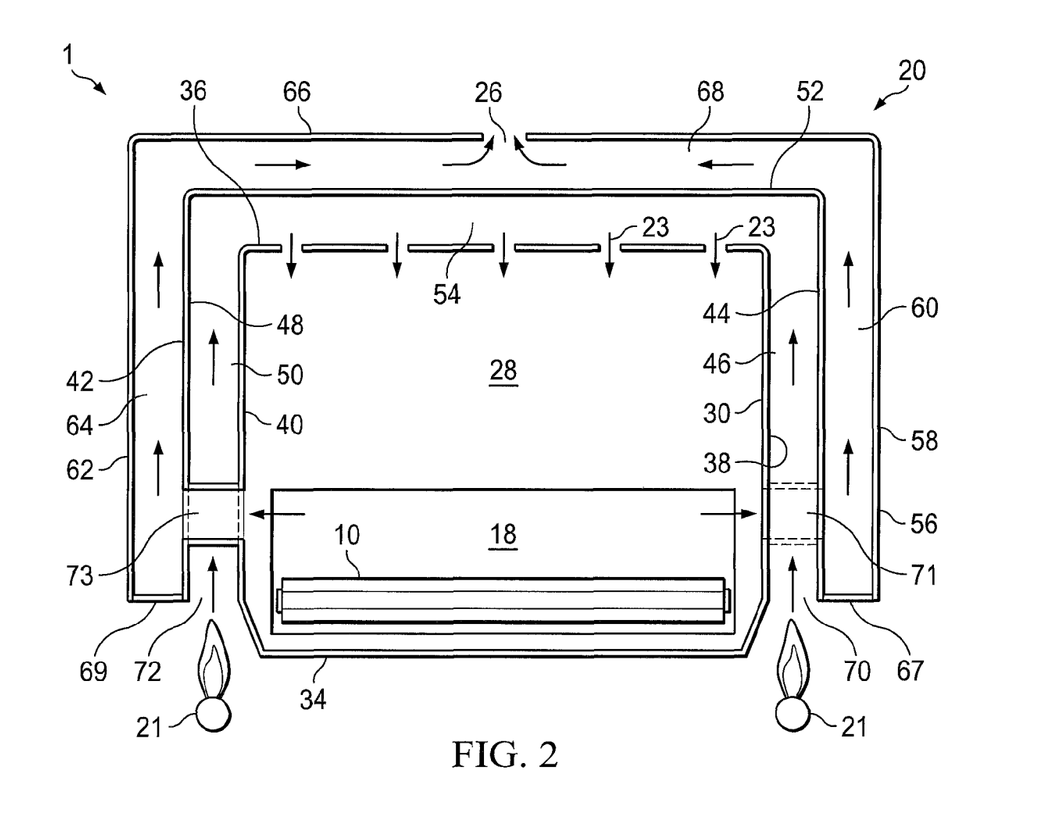
FIG. 2 is a cut-away elevational front end view of the inventive apparatus 1.

An embodiment 1 of the combustion-type cooking, heating, and/or drying apparatus provided by the present invention is illustrated in FIGS. 1 and 2. By way of example, but not by way of limitation, the inventive apparatus 1 shown in FIGS. 1 and 2 is a linear industrial tunnel-type oven which comprises: an elongate horizontal housing 20 having a heating chamber 28 therein, the heating chamber 28 having a front (inlet) end opening 16 and a rear (outlet) end opening 18; a conveyor 10 which enters the inlet end opening 16, runs through the elongate internal heating chamber 28, and exits the outlet end opening 18; and one or more burners 21 for generating a combustion product gas for heating the inventive apparatus 1.

The elongate horizontal housing 20 comprises an elongate, horizontally extending interior heating chamber box 30 which has an approximately rectangular cross-sectional shape and which surrounds or substantially surrounds the heating chamber 28 in the vertical cross-sectional plane 32. The heating chamber box 30 extends longitudinally from the inlet end 27 to the outlet end 29 of the oven housing 20.

In the lateral cross-sectional view provided in FIG. 2, the heating chamber box 30 comprises: a horizontal bottom wall 34 beneath the conveyor 10; a horizontal top wall 36 which is spaced above the conveyor 10; an upwardly extending right side wall 38 positioned adjacent the right side of the conveyor 10; an upwardly extending left side wall 40 positioned adjacent the left side of the conveyor 10; and a plurality of combustion product gas flow openings 23 formed through the horizontal top wall 36. The gas flow openings 23 in the horizontal top wall 36 will preferably be provided along most, and more preferably along at least 80%, of the longitudinal length of the housing 20.

The elongate housing 20 further comprises an elongate, horizontally extending intermediate shell 42 which is positioned over the interior heating chamber box 30. The intermediate shell 42 preferably extends horizontally from the inlet end 27 to the outlet end 29 of the oven housing 20. In the lateral cross-sectional view provided in FIG. 2, the intermediate shell 42 comprises: (a) an upwardly extending right side wall 44 which is spaced outwardly apart from the right side wall 38 of the interior heating chamber box 30 such that an upwardly extending right side inner combustion product gas flow gap 46 is formed between the right side interior and intermediate walls 38 and 44; (b) an upwardly extending left side wall 48 which is spaced outwardly apart from the left side wall 40 of the interior heating chamber box 30 such that an upwardly extending left side inner combustion product gas flow gap 50 is formed between the left side interior and intermediate walls 40 and 48; and (c) a horizontal top wall 52 which is spaced upwardly apart from the horizontal top wall 36 of the interior heating chamber box 30 such that a top horizontal inner combustion product gas flow gap 54 is formed between the top interior and intermediate walls 36 and 52.

In addition, the elongate housing 20 further comprises an elongate, horizontally extending outer shell 56 which is positioned over the intermediate shell 42. The outer shell 56 preferably extends horizontally from the inlet end 27 to the outlet end 29 of the oven housing 20. In the lateral cross-sectional end view provided in FIG. 2, the elongate outer shell 56 comprises: (a) an upwardly extending right side wall 58 which is spaced outwardly apart from the right side wall 44 of the intermediate shell 42 such that an upwardly extending right side outer combustion product gas flow gap 60 is formed between the right side intermediate and outer walls 44 and 58; (b) an upwardly extending left side wall 62 which is spaced outwardly apart from the left side wall 48 of the intermediate shell 42 such that an upwardly extending left side outer combustion product gas flow gap 64 is formed between the left side intermediate and outer walls 48 and 62; (c) a horizontal top wall 66 which is spaced upwardly apart from the horizontal top wall 52 of the intermediate shell 42 such that a top horizontal outer combustion product gas flow gap 68 is formed between the top intermediate and outer walls 52 and 66; and (d) one or more combustion product gas exhaust openings 26 which are preferably provided in the top horizontal wall 66 of the elongate outer shell 56.

The bottoms 67 and 69 of the outer combustion product gas flow gaps 60 and 64 on the right and left sides of the apparatus 1 are preferably closed. In addition, a series of right side flow ducts 71 and a series of left side flow ducts 73 are provided in the bottom portion of the heating chamber 28. The flow ducts 71 and 73 extend outwardly through the right and left interior side walls 38 and 40 and through the right and left intermediate side walls 44 and 48 to place the bottom portion of the heating chamber 28 in fluid communication with the bottom end portions of the outer combustion product gas flow gaps 60 and 64 on the right and left sides of the inventive apparatus 1.

The burners 21 used in the inventive apparatus 1 can be any type of burner capable of delivering a hot combustion product gas into the open bottom ends 70 and 72 of the right and left side inner gas flow gaps 46 and 50. The burners 21 will preferably be gas or liquid burners and will most preferably be operable for burning a gas fuel. In addition, the burners 21 will preferably be either (1) line burners or (2) pipe burners having a series of ports or nozzles extending along the top thereof for discharging a combustion fuel or for discharging a fuel and air mixture. The burners 21 will preferably extend longitudinally on the left and right sides of the inventive apparatus 1 either beneath or within the open bottom ends 70 and 72 of the right and left side inner combustion product gas flow gaps 46 and 50. Further, it will also be understood that smoke (e.g., wood smoke) from a smoke generator or other source can optionally be added to the combustion product gas produced by the burners 21.

The conveyor 10 used in the inventive apparatus 1 can be any type of open, closed, or semi-open conveyor belt suitable for delivering the food products or other items or materials in question through the inventive apparatus 1 for cooking, heating, and/or drying. In addition, although a belt-type conveyor 10 is illustrated in FIG. 2, it will be understood that other types of conveyors can alternatively be used in the inventive apparatus 1. By way of example, but not by way of limitation, the conveyor could alternatively be (a) a chain-type conveyor from which the items could be hung and carried in suspension as they are delivered through the heating chamber 28, (b) a wire mesh conveyor, or (c) a spiral conveyor.

Further, it will also be understood that the inventive apparatus 1 and the conveyor 10 can be operable for (a) continuously delivering a stream of items or materials through the heating chamber 28 at a constant conveyor speed, (b) delivering an individual item or batch of items or materials into stationary position within the heating chamber 28 and then removing the item or batch from the apparatus 1 when the cooking, heating, and/or drying operation is completed, or (c) delivering streams or batches of items or materials through the heating chamber 28 on generally any other variable speed or intermittent/start-stop basis.

During operation, the hot combustion product gas produced by the burners 21 flows into the open lower ends 70 and 72 of the inner combustion product gas flow gaps 46 and 50 on the right and left sides of the apparatus 1. As the hot combustion product gas flows upwardly through the right and left inner flow gaps 46 and 50, it heats the outer surfaces of the right and left side walls 38 and 40 of the interior heating chamber box 30 so that infrared radiant energy is emitted from the inner surfaces of the right and left side walls 38 and 40 of the interior heating chamber box 30 into the heating chamber 28. The hot combustion product gas then flows out of the upper ends of the inner gas flow gaps 46 and 50 and into the horizontal inner gas flow gap 54 in the top of the inventive apparatus 1. The flow of the combustion product gas through the top inner flow gap 54 also heats the outer surface of the horizontal top wall 36 of the interior heating chamber box 30 so that infrared radiant energy is emitted from the top interior wall 36 into the heating chamber 28.

Next, the gas is delivered via the combustion product gas flow openings 23 in the horizontal top wall 36 of the interior heating chamber box 30 into the upper portion of the heating chamber 28. Subsequently, the combustion product gas flows downwardly through the heating chamber 28, wherein it contacts the food products or other items or materials on the conveyor 10. The combustion product gas then flows outwardly through the side flow ducts 71 and 73 located in the bottom of the heating chamber 28 and into the lower ends of the outer combustion product gas flow gaps 60 and 64 on the right and left sides of the apparatus 1.

As the combustion product gas then flows upwardly through the right and left outer flow gaps 60 and 64, it increases the operating temperature of the right and left intermediate side walls 44 and 48. Finally, when the combustion product gas reaches the upper ends of the right and left outer flow gaps 60 and 64, the combustion product gas is discharged to the atmosphere via the top horizontal outer gas flow gap 68 and the top exhaust opening(s) 26.

The flow of the combustion product gas upwardly through the inner gas flow gaps 46 and 50, downwardly through the heating chamber 28, and then upwardly through the outer gas flow gaps 60 and 64 operates to extract significantly more heat from the combustion product gas as compared to other prior art combustion-type systems. This is achieved in the inventive apparatus 1 by (a) retaining the combustion product gas in the apparatus 1 for a significantly longer period of time and (b) heating not only the outer surfaces of the right and left side walls 38 and 40 of the interior heating chamber box 30 surrounding the heating chamber 28, but also warming the left and right intermediate walls 44 and 48 and directly contacting and heating the food products or other items or materials in the heating chamber 28.

Moreover, the operational heat recovery and efficiency of the inventive apparatus 1 are further enhanced by the intentional selection and combination of the preferred upward and downward flow paths of the combustion product gas through the right and left side inner flow gaps 46 and 50, the heating chamber 28, and the right and left side outer flow gaps 60 and 64. As the hot combustion product gas flows upwardly through the inner flow gaps 46 and 50, it is traveling in classic counter-current heat exchange relationship with the cooler combustion product gas flowing downwardly through the heating chamber 28, thus increasing the transfer of heat into the heating chamber 28. However, the upward flow of the hot combustion product gas through the right and left inner flow gaps 46 and 50 is in parallel relationship with the upward flow of the cooler combustion product gas traveling through the right and left outer gaps 60 and 64 so that the outward transmission (i.e., loss) of heat from the inner vertical gas flow gaps 46 and 50 to the outer vertical gas flow gaps 60 and 64 is reduced.

In addition, the extended flow path of the combustion product gas through the inventive apparatus 1 increases the backpressure at the burners 21 by an amount sufficient to provide a beneficial reduction in the amount of excess air which flows into the apparatus 1.

Further, food products prepared in the inventive system 1 retain significantly more moisture than food products cooked in prior art combustion-type convective systems. This is because (a) from about 65% to about 75% of the cooking energy transmitted to the food products in the inventive apparatus 1 will be in the form of infrared radiant energy, (b) as a result of having to first heat the right and left side walls 38 and 40 of the interior heating chamber box 30 before entering the heating chamber 28, the temperature of the combustion product gas in the inventive apparatus 1 will have been reduced to a more desirable level (i.e., typically a low heat to high heat cooking range of from about 200° to about 600° F.) before contacting the food products, and (c) a gentler, lower volume convective flow regime is achieved in the heating chamber 28 of the inventive apparatus 2 by reducing both the volume of excess air and the amount of fuel used in the combustion process.

It is also noted concerning the more gentle flow and operation of the combustion product gas through the heating chamber 28 that as a result of having already given up energy in heating the side walls 38 and 40 and the top wall 36 of the heating chamber box 30, the convective flow velocity of the combustion product gas through the heating chamber 28 will be further reduced. In addition, the lower velocity of the combustion product gas reduces the convective heat transfer coefficient and thereby reduces the convective heat transfer to the objects carried by the conveyor 10 through the inventive apparatus 1 so that the ratio of infrared heating energy transferred to the objects versus convective energy can be further increased.

Although the embodiment 1 of the inventive apparatus illustrated in FIGS. 1 and 2 has a rectangular cross-sectional shape, it will be understood that rounded, cylindrical, or other cross-sectional shapes can alternatively be used. In addition, it will be understood that the location, size, configuration, and/or arrangement of any or all of the interior gas flow openings 23, ducts 71 and 73, and exhaust opening(s) 26 can be varied as desired to (a) facilitate, increase, or slow the flow of the combustion product gas through the inventive apparatus 1 and/or (b) alter or optimize the balance of infrared and convective heat transfer occurring within the heating chamber 28.

Also, the outer shell 56 of the inventive apparatus 1 can be insulated to further reduce heat loss and thus further increase the energy efficiency of the inventive system. Further, one or more fans can be installed on the apparatus exhaust or at the burner air intake to increase the heat output of the burners 21 and/or boost or facilitate the circulation of the combustion product gas through the inventive system. Additionally, for spiral oven applications or for any other form of the inventive apparatus, the inner and outer combustion product gas flow channels can alternatively be provided on three or four vertical sides of the heating chamber or can otherwise be configured to extend partially around, substantially entirely around, or entirely around the heating chamber in a horizontal plane extending through the heating chamber, and/or in a vertical plane extending through the heating chamber.

Figure 3:
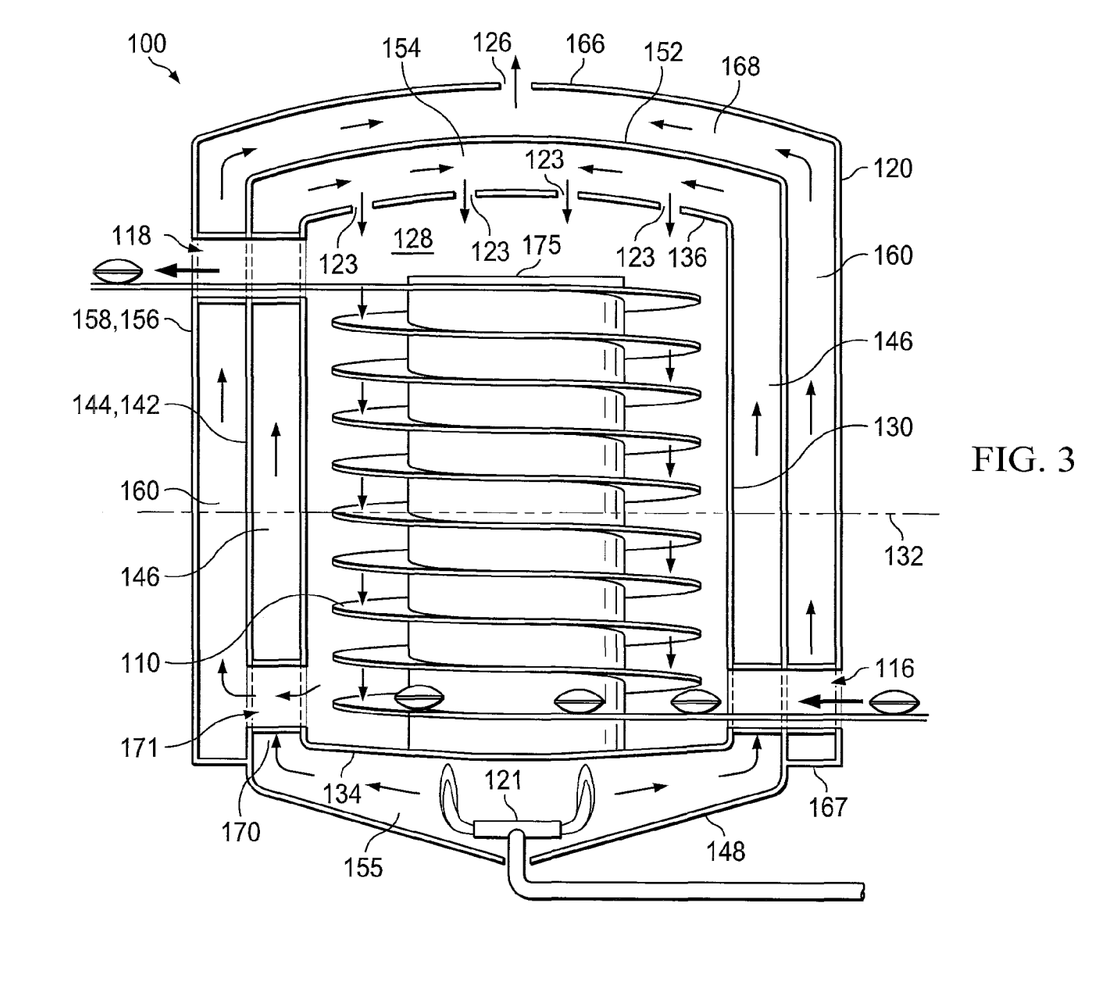
FIG. 3 is a cut-away elevational view of a spiral embodiment 100 of the inventive cooking, heating, and/or drying apparatus.
Figure 4:
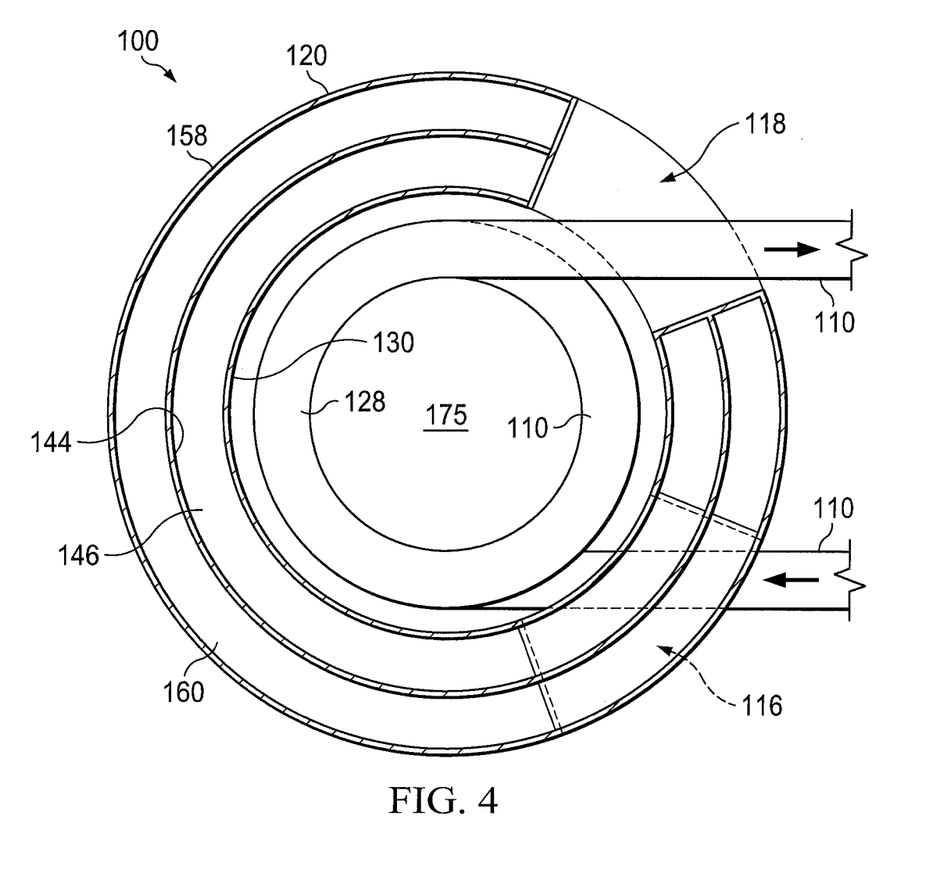
FIG. 4 is a cut-away top view of the inventive spiral cooking, heating, and/or drying apparatus 100.

An alternative embodiment 100 of the inventive combustion-type cooking, heating, and/or drying apparatus is illustrated in FIGS. 3 and 4. The inventive apparatus 100 is an industrial spiral oven comprising: a cylindrical vertical housing 120 having a vertically-extending heating chamber 128 therein, the heating chamber 128 having a lower inlet opening 116 and an upper outlet opening 118; a spiral conveyor 110 which enters the lower inlet opening 116, travels upwardly in a spiral pattern through the vertically extending heating chamber 128, and exits the upper outlet opening 118; and one or more burners 121 for generating a combustion product gas for heating the inventive apparatus 100.

The vertical cylindrical housing 120 comprises a vertically extending interior cylindrical heating chamber wall 130 which surrounds the heating chamber 128 in the horizontal cross-sectional plane 132. The interior heating chamber wall 130 extends vertically from an elevation below the conveyor inlet opening at 116 to an elevation above the conveyor outlet opening 118.

The vertically extending heating chamber 128 further comprises: a horizontal or downwardly concave bottom wall 134 at an elevation beneath the conveyor inlet opening 116; a horizontal or upwardly concave top wall 136 at an elevation above the conveyor outlet opening 118; and a plurality of combustion product gas flow openings 123 formed through the top wall 136.

The cylindrical housing 120 of the inventive apparatus 100 further comprises an intermediate shell 142 which includes an upwardly extending cylindrical wall 144. The intermediate cylindrical wall 144 is spaced outwardly apart from the cylindrical interior wall 130 of the heating chamber 128 such that an upwardly extending, cylindrical, inner combustion product gas flow annulus 146 is formed between the vertical interior wall 130 and the vertical intermediate wall 144. The vertical inner combustion product gas flow annulus 146 surrounds the heating chamber 128 in the horizontal plane 132 and extends from an elevation below the conveyor inlet opening 116 to an elevation above the conveyor outlet opening 118.

The intermediate shell 142 further comprises a downwardly concave or frusto-conical bottom wall 148 and a horizontal or upwardly concave top wall 152. The bottom wall 148 of the intermediate shell 142 is spaced downwardly apart from the interior heating chamber bottom wall 134 to form a combustion chamber 155 in which the burner(s) 121 is/are housed. The top wall 152 of the intermediate shell 142 is spaced upwardly apart from the top interior heating chamber wall 136 such that a top inner combustion product gas flow gap 154 is formed between the top interior and intermediate walls 136 and 152.

In addition, the vertical cylindrical housing 120 of the spiral apparatus 100 also comprises an outer shell 156 which includes an upwardly extending cylindrical wall 158. The outer cylindrical wall 158 is spaced outwardly apart from the cylindrical intermediate wall 144 of the intermediate shell 142 such that an upwardly extending, cylindrical, outer combustion product gas flow annulus 160 is formed between the vertical intermediate wall 144 and the vertical outer wall 158. The vertical outer combustion product gas flow annulus 160 surrounds both the heating chamber 128 and the inner vertical gas flow annulus 146 in the horizontal plane 132.

The outer vertical flow annulus 160 extends from an elevation below the conveyor inlet opening 116 to an elevation above the conveyor outlet opening 118. The outer shell 156 further comprises a horizontal or upwardly concave top wall 166 which is spaced upwardly apart from the top wall 152 of the intermediate shell 142 such that a top outer combustion product gas flow gap 168 is formed between the top intermediate and outer walls 152 and 166. One or more combustion product gas exhaust openings 126 are preferably provided in the top wall 166 of the outer shell 156.

The bottom end 167 of the outer combustion product gas flow annulus 160 is preferably closed. In addition, a series of flow ducts 171 is provided in the bottom portion of the heating chamber 128. The flow ducts 171 extend radially outward through the interior vertical heating chamber wall 138 and the vertical intermediate wall 144 to place the bottom portion of the heating chamber 128 in fluid communication with the bottom end of the outer combustion product gas flow annulus 160. The series of flow ducts 171 preferably surrounds the lower portion of the heating chamber 128.

The burner(s) 121 used in the inventive apparatus 100 can be any type of burner capable of producing a hot combustion product gas in the combustion chamber 155 for delivery by the combustion chamber 155 into the lower end of the inner vertical combustion product gas flow annulus 146. Alternatively, however, the burner 121 can, for example, be a ring burner which is positioned directly below or within the open bottom end 170 of the inner vertical combustion product gas flow annulus 146.

Each burner 121 will preferably be a gas or liquid burner and will most preferably be operable for burning a gas fuel. It will also be understood that smoke (e.g., wood smoke) from a smoke generator or other source can optionally be added to the combustion product gas produced by the burner(s) 121.

The conveyor 110 used in the inventive apparatus 100 can be any type of wire or other open, closed, or semi-open spiral conveyor or conveyor belt suitable for delivering the food products or other items or materials in question through the inventive apparatus 100 for cooking, heating, and/or drying.

During operation, the hot combustion product gas produced by the burner(s) 121 flows into the open lower end 170 of the inner gas flow annulus 146 of the apparatus 100. As the hot combustion product gas flows upwardly through the inner flow annulus 146, it heats the outer surface of the cylindrical interior heating chamber wall 130 so that infrared radiant energy is emitted from the inner surface of the vertical interior wall 130 into the heating chamber 128. The hot combustion product gas then flows out of the upper end of the inner combustion product gas flow annulus 146 and into the inner combustion product gas flow gap 154 in the top of the inventive apparatus 100. The flow through the top inner flow gap 154 heats the outer surface of the top interior wall 136 so that infrared radiant energy can also be emitted from the top interior wall 136 into the heating chamber 128.

Next, the combustion product gas is delivered via the flow openings 123 in the top interior wall 136 into the upper portion of the heating chamber 128. Subsequently, the combustion product gas flows downwardly through the heating chamber 128, wherein it contacts the food products or other items or materials on the spiral conveyor 110. The combustion product gas then flows radially outward through the flow ducts 171 located in the bottom of the heating chamber 128 and into the lower end of the outer cylindrical combustion product gas flow annulus 160 of the apparatus 100.

As the combustion product gas then flows upwardly through outer cylindrical flow annulus 160 it increases the operating temperature of the cylindrical intermediate wall 144. Finally, when the combustion product gas reaches the upper end of the outer flow annulus 160, the combustion product gas is discharged to the atmosphere via the top outer combustion product gas flow gap 168 and the top exhaust opening(s) 126.

Although the embodiment 100 of the inventive spiral heating apparatus illustrated in FIGS. 3 and 4 comprises only a single pair of concentric exterior inner and outer combustion product gas flow annuli 146 and 160 which surround the heating chamber 128, it will be understood that a pair of concentric cylindrical gas flow annuli could alternatively be provided within the central column 175 of the spiral heating apparatus 100 such that infrared radiant heating energy is emitted from the outer surface of the central column 175 into the heating chamber 128.

Figure 5:
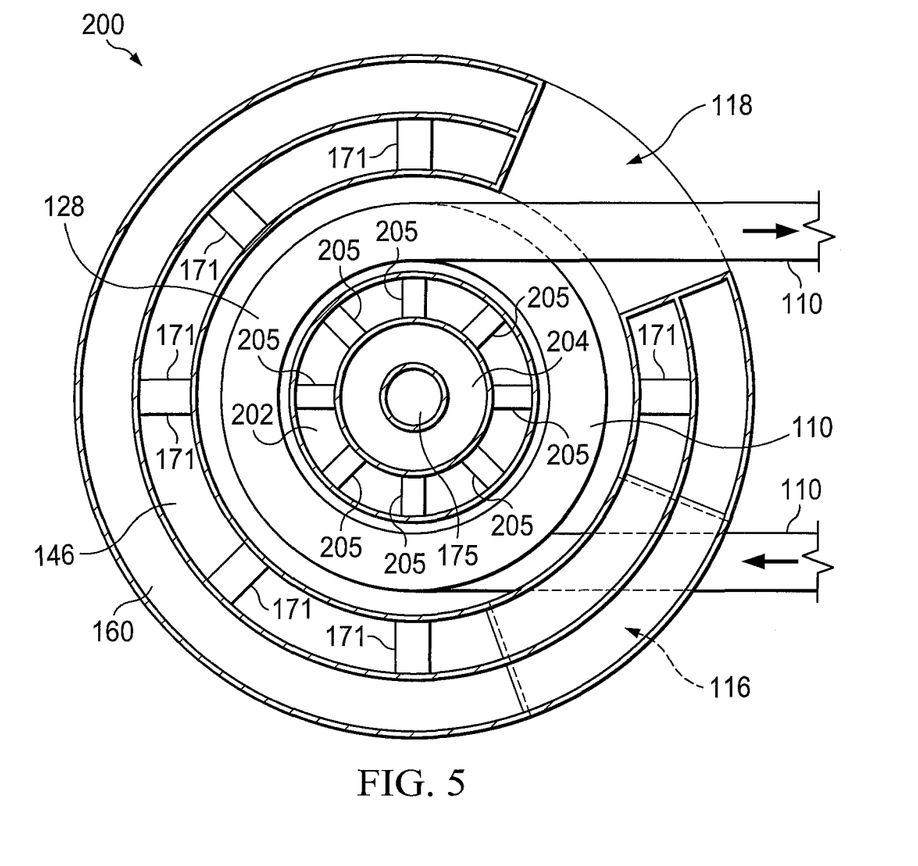
FIG. 5 is a cut-away top view of an alternative spiral embodiment 200 of the inventive cooking, heating, and/or drying apparatus.

Moreover, as illustrated in the alternative embodiment 200 shown in FIG. 5, the inventive spiral heating apparatus can be equipped with both (a) the same concentric exterior combustion product gas flow annuli 146 and 160 surrounding the heating chamber 128 as used in apparatus 100 and (b) a second pair of concentric, cylindrical, upwardly extending combustion product gas flow annuli 202 and 204 within the central column 175. A plurality of flow ducts 205 extend radially inward through the central flow annulus 202 which is closest to the heating chamber 128 to place the lower end portion of the heating chamber 128 in fluid communication with the lower end portion of the central flow annulus 204 which is within, and extends upwardly through, the flow annulus 202.

As will be apparent, in each case, regardless of whether the concentric flow annuli are located around the exterior of the heating chamber 128 or within the central column 175, the combustion product gas will preferably first flow upwardly though the annulus closest to the heating chamber 128 and then will subsequently flow upwardly through the annulus furthest from the heating chamber 128 after flowing downwardly through the heating chamber 128 itself.

Consequently, in the inventive spiral apparatus 200 illustrated in FIG. 5, a combustion product gas produced in or below the bottom of the apparatus 200 will first flow upwardly through both (a) the flow annulus 146 as described for apparatus 100 and (b) the annulus 202 within the central column 175 which is closest to the heating chamber 128. Next, the combustion product gas from annulus 146 and annulus 202 will flow downwardly through the heating chamber 128. Then the combustion product gas will simultaneously flow (a) outwardly via the flow ducts 171 from the lower portion of the heating chamber 128 into the lower end portion of outer flow annulus 160 as described for apparatus 100 and (b) inwardly via the flow ducts 205 from the lower portion of the heating chamber 128 into the lower end portion of the annulus 204 within the central column 175 which is furthest from the heating chamber 128. Next, the combustion product gas will flow upwardly through both the flow annulus 160 and the annulus 204.

It will be understood by those in the art that for any spiral, linear, or other configuration of the inventive cooking, heating, and/or drying apparatus, baffles, flaps, fans, insulation, and/or other elements or structures known in the art can be used to prevent or at least significantly reduce the loss of the hot combustion products from the conveyor inlet and outlet openings and the loss of heat from the apparatus in general.

It will also be understood by those in the art that each of the inventive cooking, heating, and/or drying apparatuses 1, 100, and 200 can include any type of desired operating and control system, instruments, sensors, manual controls, automatic controls, etc. known in the art for: monitoring temperatures within the heating chamber and/or at any other desired location within the unit; monitoring the temperatures of the items or materials being heated; setting, adjusting, and/or controlling the movement and speed of the conveyor; setting, adjusting, and/or controlling temperatures or combustion or fuel rates; igniting the burners; etc.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. An apparatus for cooking, heating or drying comprising:
    a horizontal housing tunnel having an inlet end opening and an outlet end opening;
    a horizontal heating chamber within the housing tunnel for cooking, heating, or drying;
    a conveyor which enters the inlet end opening of the housing tunnel, extends through the heating chamber, and exits the outlet end opening of the housing tunnel;
    upwardly extending right and left side walls of the housing tunnel on opposite lateral sides of the conveyor;
    upwardly extending right and left side walls of the heating chamber inside of the upwardly extending right and left side walls of the housing tunnel, wherein the upwardly extending right and left side walls of the heating chamber face, and are on the opposite lateral sides of, the conveyor;
    upwardly extending right and left intermediate side walls on the opposite lateral sides of the conveyor, the right intermediate side wall being positioned between the upwardly extending right side wall of the housing tunnel and the upwardly extending right side wall of the heating chamber and the left intermediate side wall being positioned between the upwardly extending left side wall of the housing tunnel and the upwardly extending left side wall of the heating chamber;
    upwardly extending right and left inner flow gaps on the opposite lateral sides of the conveyor, the right inner flow gap being formed between the upwardly extending right side wall of the heating chamber and the upwardly extending right intermediate side wall and the left inner flow gap being formed between the upwardly extending left side wall of the heating chamber and the upwardly extending left intermediate side wall, wherein the right and left inner flow gaps have bottom ends;
    upwardly extending right and left outer flow gaps on the opposite lateral sides of the conveyor, the right outer flow gap being formed between the upwardly extending right intermediate side wall and the right side wall of the housing tunnel and the left outer flow gap being formed between the upwardly extending left intermediate side wall and the left side wall of the housing tunnel; and
    one or more fuel burners positioned to deliver a combustion gas product into the bottom ends of the right and left inner flow gaps,
    wherein the heating chamber and the right and left outer flow gaps have bottoms which are closed, the right and left outer flow gaps are spaced apart from the heating chamber by the right and left inner flow gaps, a plurality of right side flow ducts and a plurality of left side flow ducts are provided on the opposite lateral sides of the conveyor, the right side flow ducts have inlet openings in a lower portion of the right side wall of the heating chamber and outlet openings in a lower portion of the right intermediate side wall and extend laterally through a lower portion of the right inner flow gap, the left side flow ducts have inlet openings in a lower portion of the left side wall of the heating chamber and outlet openings in a lower portion of the left intermediate side wall and extend laterally through a lower portion of the left inner flow gap, and the right and left side flow ducts prevent flow from the lower portion of the heating chamber into the lower portions of the right and left inner flow gaps, so that a flow path is defined in the housing tunnel for the combustion products from the one or more fuel burners wherein the combustion products are forced to flow first upwardly through the right and left inner flow gaps, then downwardly through the heating chamber to establish a countercurrent heat exchange flow relationship between the heating chamber and the right and left inner flow gaps, then outwardly through the right and left side flow ducts from the lower portion of the heating chamber to the lower portions of the right and left outer flow gaps, and then upwardly through the right and left outer flow gaps to establish a co-current flow relationship between the right outer flow gap and the right inner flow gap and a co-current flow relationship between the left outer flow gap and the left inner flow gap.

2. The apparatus of claim 1 wherein the right and left side walls of the housing tunnel are outermost right and left side walls of the housing tunnel.

* * * * *